United States Patent [19]
Ershov

[11] Patent Number: 5,835,210
[45] Date of Patent: Nov. 10, 1998

[54] MULTI-PASS SPECTROMETER

[75] Inventor: Alexander I. Ershov, San Diego, Calif.

[73] Assignee: Cymber, Inc., San Diego, Calif.

[21] Appl. No.: 926,948

[22] Filed: Sep. 10, 1997

[51] Int. Cl.$^6$ ....................................................... G01J 3/18
[52] U.S. Cl. ............................................................ 356/328
[58] Field of Search ..................... 356/300, 305, 356/326, 328, 331, 332, 334

[56] References Cited

PUBLICATIONS

Hettrick, Michaeal C., "In–focus monochromator: theory and experiment of a new grazing incidence mounting", Applied Optics, 1 Nov. 1990, vol. 29, No. 31, pp. 4531–4535.
Loewen, Erwin G. and Popov, Evgeny, "Diffraction Gratings and Applications", Copyright 1997, pp. 191–247 and pp. 464–474.
Murcray, David G., Murcray, Frank H. and Walter J. Williams, "A Balloon–Borne Grating Spectrometer", Applied Optics, Feb. 1967, vol. 6, No. 2, pp. 191–196.
Palmer, Christopher, "Absolute astigmatism correction for flat field spectrographs", Applied Optics, 1 May 1989, vol, 28, No. 9, pp. 1605–1607.

Primary Examiner—F. L. Evans
Attorney, Agent, or Firm—John R. Ross

[57] ABSTRACT

A multi-pass spectrometer. Light from a source is expanded and collimated with a collimating optic into a collimated beam. The collimated beam illuminates a dispersing optic such as a grating from which light is reflected back toward the collimating optic. A transmitting-reflecting optic is positioned across the collimated beam to cause at least two reflections of at least a portion of the collimated beam from the dispersing optic. A photometer measures the double dispersed beam at a range of spacial locations in order to determine spectral characteristics of the light from the light source. In a preferred embodiment, a partially reflecting mirror is positioned between the grating and a collimated optic. This mirror is positioned at an angle slightly different from 90 degrees so that a portion of the light reflected from the dispersing optic is reflected back toward the dispersing optic at a slightly different range of angles. A portion of this second reflected beam is dispersed again and reflected at a different range of angles by the dispersing optic. A portion of this second reflected beam transmits the partially reflecting mirror and may be focused, and the intensity of the light at spatially distinct positions are measured by a photometer to access spectral characteristics of the light source. In a second preferred embodiment, the light from a third reflected beam is measured.

14 Claims, 4 Drawing Sheets

WAVE LENGTH

MULTI-PASS SPECTROMETER

This invention relates to optical devices and especially to spectrometers.

BACKGROUND OF THE INVENTION

Spectrometers are well known devices for measuring the intensity of light at various wavelengths. A typical spectrometer consists of a slit, a collimator lens, a dispersive optic, such as a prism or grating, an objective lens or lenses for focussing the various wavelengths and a photometer for measuring the intensity of the various wavelengths. FIG. 1 is a schematic drawing of such a prior art grating-based spectrometer. A light source 2 which is the subject of a wavelength measurement is sampled by an optical fiber 4 having an internal diameter of about 250 microns and a portion of the light is directed to slit 6 which is longer than the internal diameter of the fiber and has a width of about 5 microns. Light passing through slit 6 expands in the 5 micron direction in a beam 7 at an angle of about 3 degrees. The beam is reflected from mirror 8 and is collimated by lens 10 for illumination of grating 12 which in this prior art representation is arranged in a Littrow configuration. Light at various wavelengths reflecting from the grating is dispersed at angles dependant on the wavelengths. A beam representing only one wavelength is depicted in FIG. 1 as reflecting from the grating 12 back through lens 10 and reflecting off mirrors 8 and 14 and is focused to a line at 15. (The long dimension of the line is into and out of the page.) This particular wavelength is refocussed at a line 17 by objective lens 16. Light at this wavelength is measured by a photometer 18, while light at other wavelengths is blocked by a slit 19 placed in front of the photometer 18. Slit 19 and photometer 18 are placed in the same housing. Light at wavelengths other than the depicted wavelength is reflected off grating 12 at angles slightly different from that of the depicted beam. Thus, other wavelengths are measured at positions above or below line 17 by photometer 18 which, as indicated in FIG. 1, moves back and forth, together with slit 19, to make these intensity measurements.

The resolution of this prior art spectrometer is limited by dispersion of the grating and its size. Both of these parameters can only be improved up to a certain level determined by technology limits and cost. If desired parameters still cannot be achieved, then several diffraction gratings can be used in more elaborate spectrometry. This will proportionally increase the resolution. However, these more elaborate techniques can substantially increase the cost and the size of the spectrometer. What is needed is a simple and inexpensive method of substantially increasing the precision of prior art spectrometers. A particular need exists for a compact, high resolution ultraviolet spectrometer with a resolution of the order of 0.1 pm. Such a spectrometer is needed to monitor the output spectrum of narrow band excimer lasers used, for example, in micro lithography.

SUMMARY OF THE INVENTION

The present invention provides a multi-pass spectrometer. Light from a source is expanded and collimated with a collimating optic into a collimated beam. The collimated beam illuminates a dispersing optic such as a grating from which light is reflected back toward the collimating optic. A transmitting-reflecting optic is positioned across the collimated beam to cause at least two reflections of at least a portion of the collimated beam from the dispersing optic. A photometer measures the double dispersed beam at a range of spatial locations in order to determine spectral characteristics of the light from the light source. In a preferred embodiment, a partially reflecting mirror is positioned between the grating and a collimated optic. This mirror is positioned at an angle slightly different from 90 degrees so that a portion of the light reflected from the dispersing optic is reflected back toward the dispersing optic at a slightly different range of angles. That light is dispersed again and reflected at a different range of angles by the dispersing optic. A portion of this second reflected beam transmits the partially reflecting mirror and may be focused, and the intensity of the light at spatially distinct positions are measured by a photometer to determine spectral characteristics of the light source. In a second preferred embodiment, the light from a third reflected beam is measured.

DETAILED DESCRIPTION OF PREFERRED EMBODIMENTS

Figure 1:
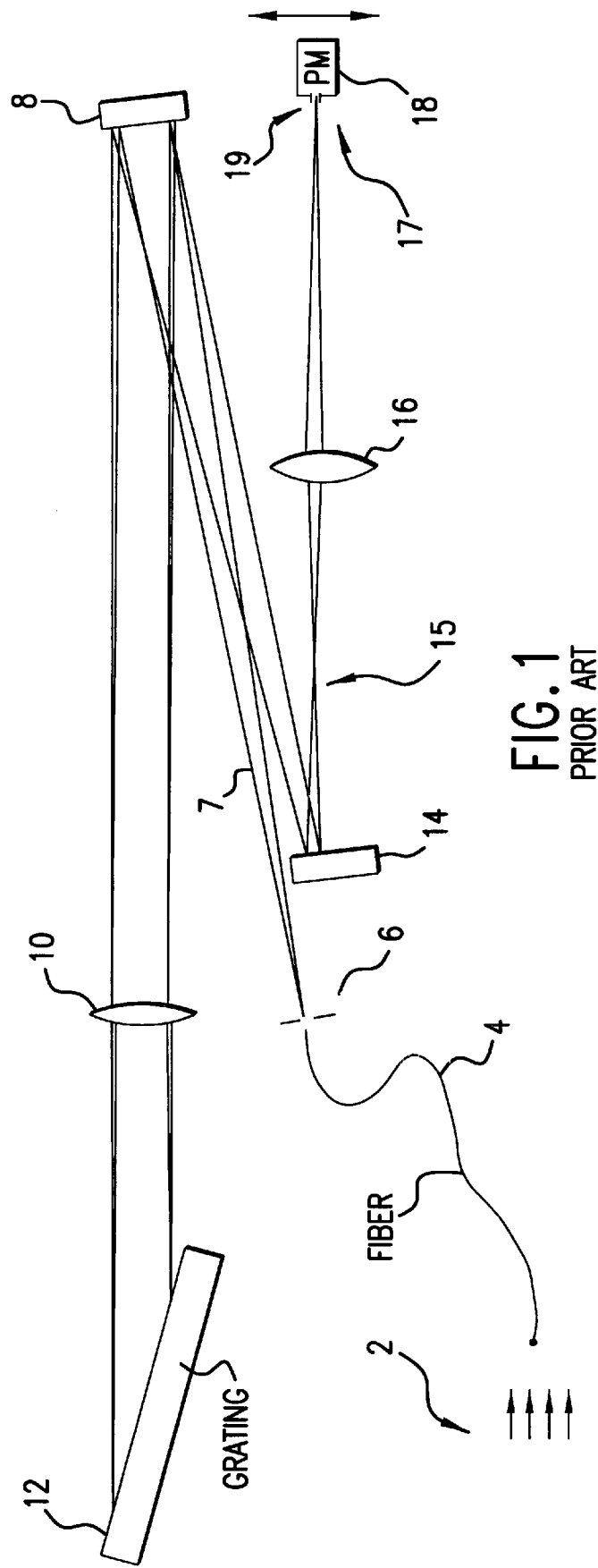
FIG. 1 is a schematic drawing of a prior art spectrometer.
Figure 2:
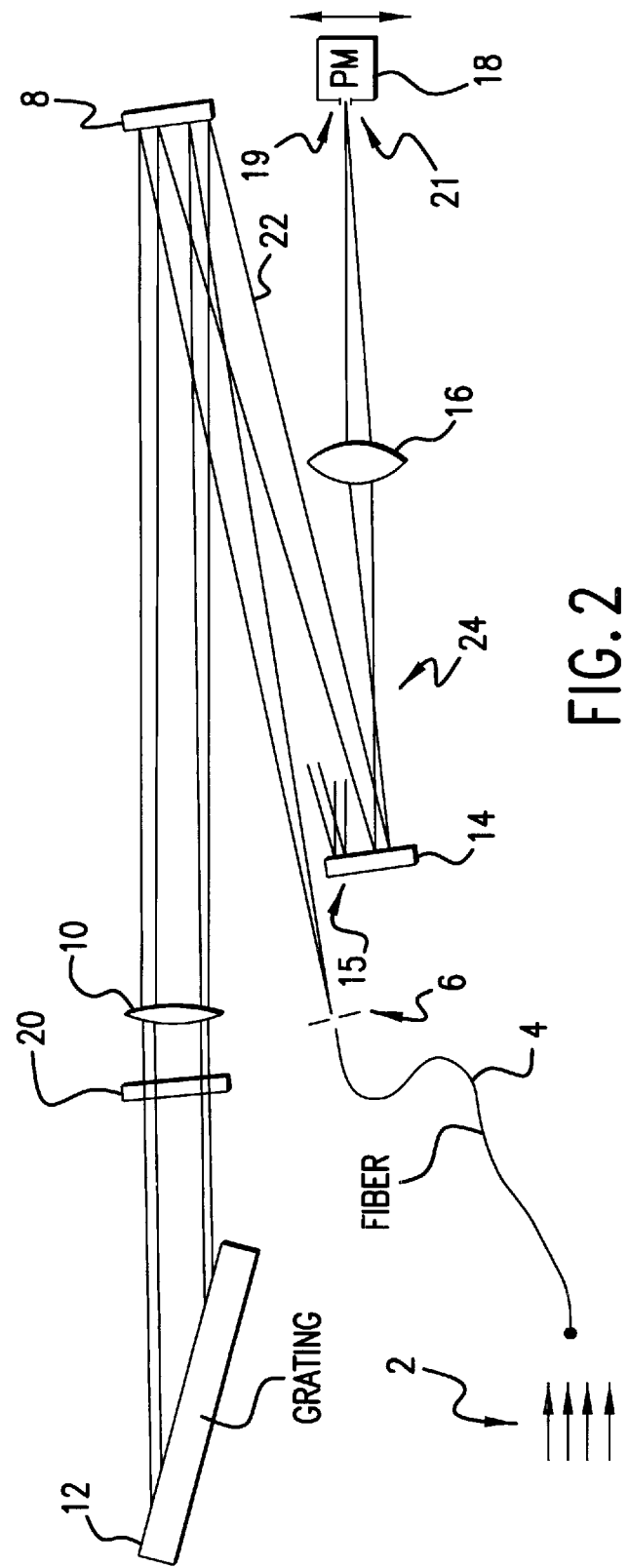
FIG. 2 is a schematic drawing describing a preferred embodiment of the present invention.

FIG. 2 shows a preferred embodiment of the present invention. The FIG. 2 arrangement is substantially the same as the prior art spectrometer shown in FIG. 1 except there has been inserted between lens 10 and grating 12 a partially reflecting mirror 20 having a 30 percent reflectivity. The mirror is positioned at an angle of about 0.034 degrees with a plane perpendicular to the beam directed from mirror 8 toward grating 12.

The effect of partially reflecting mirror 20 is to reflect about 30 percent of the beam first from grating 12 back again onto grating 12 at a slightly different angle of about 0.068 degrees below the direction of the first beam. (About 70 percent of the light in the first reflection transmits partially reflecting mirror 20.) The reflected portion of the beam is reflected and dispersed a second time again returning to partially reflecting mirror 20 where 70 percent of the second reflected beam transmits partially reflecting mirror 20.

A portion of this light in this second reflected beam representing light at a particular wavelength (hereinafter $\lambda_p$) is depicted as beam 22. Light in this beam (at $\lambda_p$) is focussed first into a line 24 (shown on FIG. 2 as a point at 24, the line being into and out of the page), and then into a line 21 (again, the line is shown as point 21 at slit 19 of photometer 18) and the intensity of the light in this beam is measured by the photometer 18.

Light at shorter or longer wavelengths in the second reflected beam which transmits partially reflecting mirror 20 will be focussed above or below line 21 and the intensity of light at these wavelengths may be measured by appropriate movement of photometer 18 and slit 19 as indicated by the double headed arrow.

Persons skilled in the art will recognize that the spectrometer will have high accuracy only over a narrow spectral range and should preferably be used only to perform spectral analyses of very narrow band light such as the output of a narrow band excimer laser used for integrated circuit lithography. A typical narrow banded KrF laser used for lithography might have an output at 248 nm with a 0.8 pm bandwidth. A preferred set of parameters for a preferred embodiment to measure this spectrum would be as follows:

| | |
|---|---|
| Light incidence angle of grating 12 | 78.5 degrees, Littrow configuration. |
| Lens 10 focal length | 1 meter |
| Mirror 20 angle | 0.034 degrees from perpendicular |
| Size of entrance Slit 6 | 5 µ |
| Size of slit 19 | 10 µ |
| Magnification of lens 16 | 1:2 |

Figure 4:
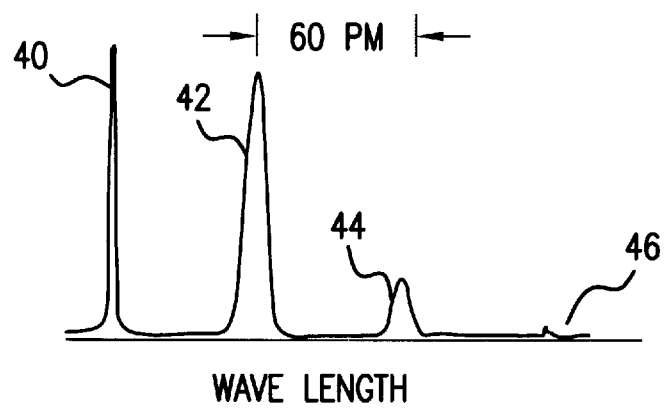
FIG. 4 is a drawing representing a chart of intensity data.

These parameters provide a resolution of about a 0.12 pm at 248 nm. A typical set of data from the measurement of the spectrum would look like the graph shown in FIG. 4.

The first peak 40 represents light reflected off mirror 20 which never reaches grating 12. This first peak can be disregarded. The second peak 42 represents light reflected once off grating 12. The second peak can be used as a reference. The third peak 44 represents light reflected twice off grating 12 and typically would provide the best spectral accuracy. The fourth peak 46 represents light reflected three times off grating 12 and may provide the best data if sufficient light is available. For the particular configuration described above, the distance between the peaks correspond to a spread in wavelength of about 60 pm. Therefore, the accuracy range of a spectrometer with the above configuration will be limited to a range of about ±30 pm. The chart represented in FIG. 4 would indicate a bandwidth of about 9 pm (FWHM) which would probably be too large for use in integrated circuit lithography where a band width of about 1–3 pm or less is desired.

Persons skilled in the art will recognize that, despite the limited spectral range, this grating spectrometer provides great advantage over etalon spectrometers which use etalon Fabri-Perot as a dispersive element. Even though an etalon spectrometers can provide similar resolution when measuring the linewidth of the laser at half the maximum, it does not provide adequate contrast and signal-to-background ratio which is essential when assessing the integral spectrum width (such as a spectral range where 95% of the energy is contained). This later measurement is extremely important for microlithography applications. In addition, this grating spectrometer does provide greater spectral range than etalon spectrometers with comparable resolution.

The relative intensity of the four peaks is analyzed as follows: We assume a mirror 20 reflectivity of R=30 percent and a reflective efficiency of grating 12 of 50 percent. Therefore, the relative intensity of the first peak (reflection off mirror 20 will be 30 percent. The relative intensity of the second peak (one reflection off grating 12 would be (70%) (50%) (70%) or 24.5 percent. The light in the third peak, i.e., two reflections off grating 12 would have a relative intensity of (70%) (50%) (30%) (50%)(70%) or 3.7%. Similarly, the light in the fourth peak would have a relative intensity of 0.55 percent.

Obviously, there is a substantial reduction of light in the third and fourth peaks with the above described embodiment of the present invention as compared to the prior art spectrometer which would provide a relative intensity of about 50%. However, this reduction in intensity is normally not a problem when measuring laser spectrum where the intensity of the available light is several orders of magnitude higher than that needed for good spectral measurements.

Figure 3:
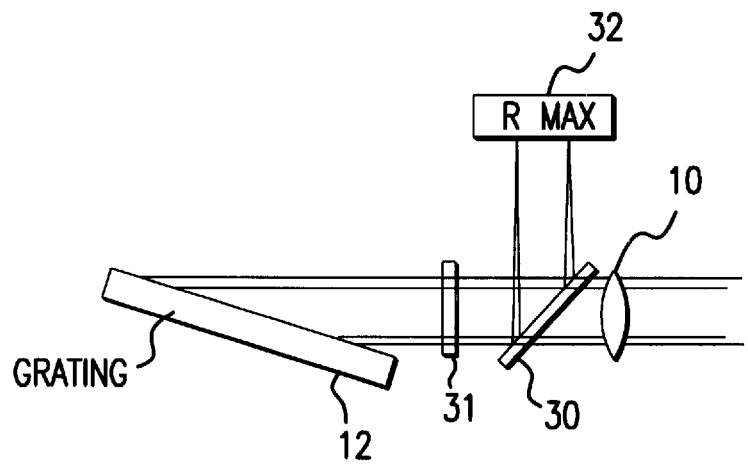
FIG. 3 is a schematic drawing describing a portion of a third preferred embodiment of the present invention.

When light intensity is limited, an embodiment such as that shown in FIG. 3 may be utilized. In this embodiment, a thin film polarizing beam splitter 30 and λ/4 wave plate 31 is placed between lens 10 and grating 12. For this preferred embodiment, the light being analyzed is presumed to be horizontally polarized. (Laser beams are typically polarized either horizontally or vertically. If the light is not already polarized, then a polarizer will need to be added.) Thin film polarizing beam splitter 30 is positioned to pass horizontally polarized light and reflect vertically polarized light. Therefore, horizontally polarized light from lens 10 passes through polarizing beam splitter 30 and is converted to circularly polarized light by quarter wave plate 31. The light reflects from grating 12 and, on passing back through quarter wave plate 31, is converted to vertically polarized light so that it is reflected by polarizing beam splitter 30, reflected by mirror 32 and reflected again by beam splitter 30 and passes back through quarter wave plate 31, where it is converted again to circularly polarized light. The beam reflects again from grating 12 and passes again through quarter wave plate 31 where it is converted this time to horizontally polarized light and passes through polarizing beam splitter 30 and lens 10. The rest of the path of this second reflected beam in this embodiment is similar to the corresponding path of the second reflected beam in the embodiment shown in FIG. 2. This latter embodiment conserves in the second reflected beam nearly all of the light in the original beam except for the losses on the grating 12. Thus, the relative intensity of double-dispersed beam would be close to (50%) (50%) or 25 percent. There might be a small additional loss of intensity due primarily to the fact that grating efficiencies are polarization sensitive. Also, in this embodiment it is desirable that the fiber 4 be a polarization preserving fiber which assures that no light is lost due to depolarization in the fiber.

Figure 5:
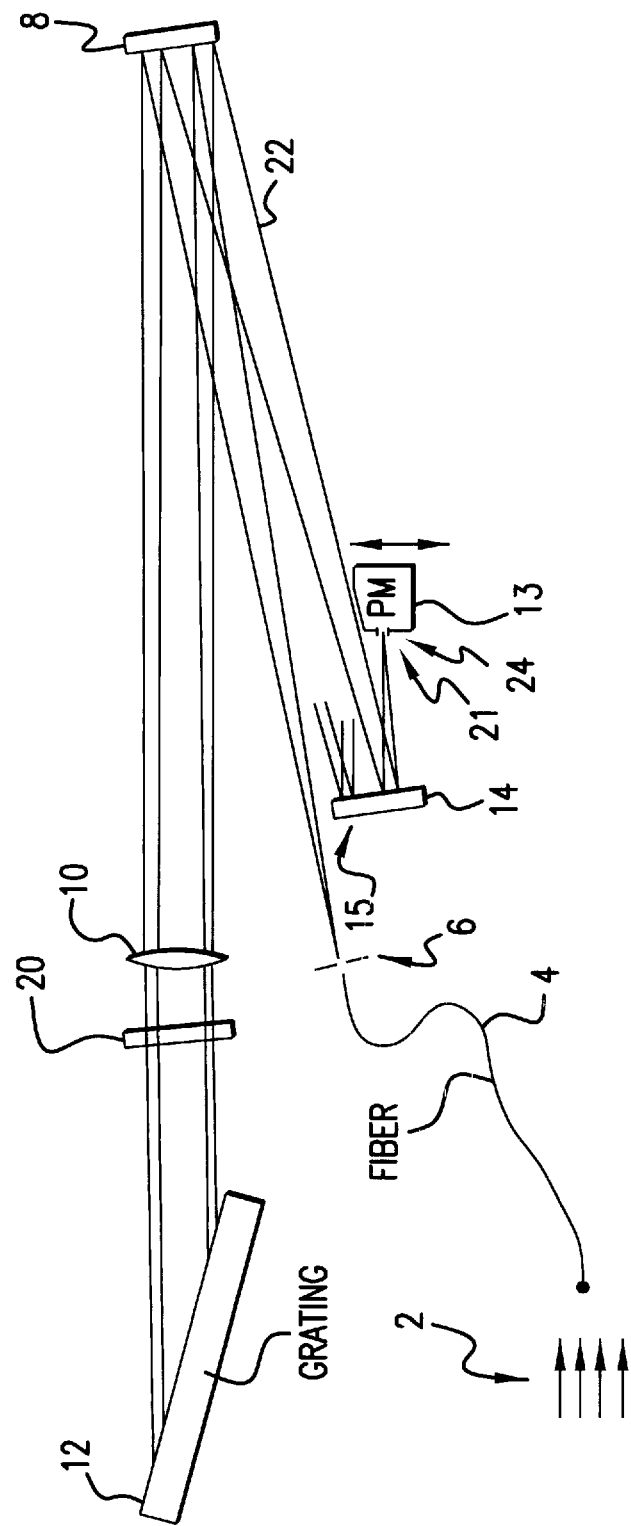
FIG. 5 is a schematic drawing describing another embodiment of the present invention.

Although this improved spectrometer has been described with reference to a particular embodiment, it is to be appreciated that various adaptations and modifications may be made. For example, a photodiode array could be substituted for the moveable photometer with the slit, or lens 16 can be eliminated and photo detector 13 and slit 21 can be at the location of the focus line 24 as shown in FIG. 5. There are many possible arrangements of the optical components other than the particular one shown in FIG. 2. One or more prisms could be substituted for the grating as the dispersing element. Well known methods other than the optical fiber and the slit could be used to direct a beam of light onto the dispersing element. If enough light is available in the original beam, the λ.p and other wavelengths in the third reflected beam could be measured. In this case, care should be taken to assure that light from the first and second reflected beams do not interfere with the measurements. Therefore, the invention is only to be limited by the claims and their legal equivalents.

That which is claimed is:

1. A multi-pass spectrometer for measuring intensity of light in a light source at various wavelengths comprising:

A. a beam expansion optic for producing an expanding light from said light source;

B. a dispersing optic;

C. a collimating optic for collimating said light from said light source to produce a collimated beam for illumination of said dispersing optic;

D. a transmitting-reflecting optical means positioned across said collimated beam for producing at least one reflection of light in said collimated beam off said dispersing optic;

E. a photometer for measuring light intensity in light reflected from said dispersing optic at a plurality of spacial locations.

2. A multi-pass spectrometer as in claim 1 wherein said transmitting-reflecting optical means comprises a partially reflecting mirror positioned across said collimated beam at an angle slightly different from 90 degrees.

3. A multi-pass spectrometer as in claim 1 wherein said transmitting-reflecting optical means comprises a polarizing beam splitter and a quarter wave plate positioned across said collimated beam and a mirror for reflecting back to said polarizing beam splitter, light reflected by said polarizing beam splitter out of said collimated beam.

4. A multi-pass spectrometer for measuring intensity of light in a light source at various wavelengths comprising:

A. a beam expansion optic for producing an expanding light from said light source;

B. a dispersing optic;

C. a collimating optic for collimating said light from said light source to produce a collimated beam for illumination of said dispersing optic;

D. a partially reflecting mirror positioned across said collimated beam at an angle slightly different from 90 degrees;

wherein said beam expanding optic, said dispersing optic, said collimating optic and said partially reflecting mirror are configured so that a portion of the light from said source is expanded by said beam expanding optic, collimated by said collimating optic, transmitted through said partially reflecting mirror, is dispersed and reflected from said dispersing optic in a first range of reflection angles, reflects from said partially reflecting mirror back toward said dispersing optic, is dispersed again, and reflected in a second range of reflection angles slightly different from said first range of reflection angle said light reflected in said second range of reflection angles being focused by said collimating optic, and E. a photometer for measuring light intensity in said light reflected in said second range of reflection angles at a plurality of spacial locations.

5. A multi-pass spectrometer as in claim 4 wherein said dispersing optic is a grating.

6. A multi-pass spectrometer as in claim 5 wherein said grating is an eschelle grating.

7. A multi-pass spectrometer as in claim 5 wherein said grating is arranged in a Littrow configuration.

8. A multi-pass spectrometer as in claim 4 wherein said beam expanding optic is a slit.

9. A multi-pass spectrometer as in claim 4 wherein said collimating optic is a lens.

10. A multi-pass spectrometer as in claim 4 wherein said photometer is a moveable photodiode.

11. A multi-pass spectrometer as in claim 4 wherein said photometer is a photodiode array.

12. A multi-pass spectrometer as in claim 8 and further comprising an optical fiber for conveying light from said source to said slit.

13. A multi-pass spectrometer as in claim 4 wherein said angle slightly different from 90 degrees is an angle differing from 90 degrees only about 0.034 degree.

14. A multi-pass spectrometer as in claim 4 wherein said photometer is configured to measure light reflected in a third range of directions from said dispersing optic.

* * * * *

UNITED STATES PATENT AND TRADEMARK OFFICE
CERTIFICATE OF CORRECTION

PATENT NO. : 5,835,210
DATED : November 10, 1998
INVENTOR(S) : Ershov

It is certified that error appears in the above-identified patent and that said Letters Patent is hereby corrected as shown below:

Cover Page of Patent "Assignee" please delete "Cymber, Inc." and insert -- Cymer, Inc.--

Signed and Sealed this

Fourth Day of May, 1999

*Attest:*

Q. TODD DICKINSON

*Attesting Officer*     Acting Commissioner of Patents and Trademarks